United States Patent [19]

Alexander

[11] 4,393,893
[45] Jul. 19, 1983

[54] LUBRICATED SPLIT PLUG VALVE

[75] Inventor: William H. Alexander, Houston, Tex.

[73] Assignee: Vapor Corporation, Chicago, Ill.

[21] Appl. No.: 215,728

[22] Filed: Dec. 12, 1980

[51] Int. Cl.³ .............................................. F16K 5/22
[52] U.S. Cl. ...................... 137/246.12; 184/105 B;
251/309; 137/315
[58] Field of Search ............. 137/246, 246.12, 246.22,
137/246.23, 315, 246.14, 246.15, 246.16;
251/310, 311, 287; 184/105 B; 25/309

[56] References Cited

U.S. PATENT DOCUMENTS

| 2,269,886 | 1/1942 | Volpin | 137/246.12 |
|---|---|---|---|
| 2,269,887 | 1/1942 | Sharp | 137/246.12 |
| 2,282,455 | 5/1942 | Church et al. | 137/246 |
| 2,591,031 | 4/1952 | Volpin et al. | 137/246.12 |
| 2,999,510 | 9/1961 | Volpin | 137/246.12 |
| 3,414,002 | 12/1968 | Volpin | 137/246.12 |

FOREIGN PATENT DOCUMENTS 1121420 1/1962 Fed. Rep. of Germany ...... 137/246

*Primary Examiner*—George L. Walten
*Attorney, Agent, or Firm*—Francis J. Lidd

[57] ABSTRACT

A lubricated split plug valve includes a valve body defining a chamber with fluid ports therethrough. A valve stem is rotatably mounted in the body and engages a split cylindrical valve member. The valve member includes a cylindrical passage with first and second inlets. The valve member includes a pair of core halves defined along an oblique plane passing through the cylindrical passage. Identical grooves are fabricated on the outer peripheral surface of the core halves with portions that substantially surround one of the passage inlets defined in the particular core half. The groove also includes a continuous portion encircling the remaining outer periphery of each core half. Each groove is in fluid communication with a reservoir wherein lubricant may be introduced from a source into the groove. A piston is in each reservoir and biased under the influence of line pressure and gravity forces.

8 Claims, 4 Drawing Figures

LUBRICATED SPLIT PLUG VALVE

BACKGROUND OF THE INVENTION

1. Field of the Invention

The present invention relates to a new and improved lubricated split plug valve that may be used on high pressure fluid lines to control the flow therethrough.

2. Description of the Prior Art

The prior art valve often recommended for heating and other treating units, gathering systems, recycling and gasoline plants, blow out preventers and other applications wherein the flow of high pressure working fluid in the range of 3,000 to 6,000 psig is controlled is a lubricated plug valve. An example of such a typical prior art valve is illustrated in U.S. Pat. No. 2,269,887 and this patent is incorporated by reference herein. Prior art valves of the type employed in systems wherein substantial pressures are controlled use valve plugs that tend to be forced against the downstream seal in the valve body resulting in the valve plug being virtually impossible to open without injecting a lubricant or sealant.

One approach to overcoming this problem in the prior art is illustrated in U.S. Pat. No. 2,269,887. This valve utilizes mating lubricating and seal grooves fabricated in both the outer peripheral surface of the valve plug and the inner peripheral surface of the valve body. In this way, overlapping communicating grooves completely encircle the downstream port in the closed position thereby allowing access of lubrication and reducing the torque required to close the valve.

These typical prior art valves, however, require correct alignment of a groove on the outer peripheral surface of the valve plug and a groove defined on the inner peripheral surface of the valve body and continuous flow of lubricant from the first groove to the second groove to ensure the desired complete lubrication. This alignment occurs only in the closed position of the plug. Due to the pressures forcing the lubricant through these grooves and the difficulty of alignment of the grooves, there is a substantial pressure drop resulting in incomplete lubrication. In addition, the high pressure fluid flowing around the valve plug tends to wash the lubricant out of these grooves defeating the purpose of the lubricating system in the typical prior art valve.

A further problem with the typical prior art valves of the type illustrated in U.S. Pat. No. 2,269,887 is that a reservoir is included in the valve body to supply lubricant to the grooves. The reservoir includes a plunger that is placed under downstream line pressure to act against lubricant forcing it into the groove; however, over a period of time, gravity acts on the plunger in a manner to create voids between the plunger and the lubricant within the reservoir resulting in inadequate lubrication even while the valve is closed. Consequently, before opening or closing the prior art valve, pressurized lubricant must be forced into the reservoir to increase the pressure to the desired level and obtain lubrication.

SUMMARY OF THE INVENTION

An object of the present invention is to provide a new and improved lubricated valve for use in high pressure pipelines and the like.

Another object of the present invention is to provide a new and improved split plug valve for use in a valve controlling high pressure fluid flow wherein the plug is split along an oblique plane to allow better lubrication around the plug valve.

A further object of the present invention is to provide a new and improved valve for high pressure lines employing a split plug valve element that requires only grooves defined on the split plug valve element for lubrication.

A still further object of the present invention is to provide a new and improved valve employed in high pressure lines that includes a lubricated split plug valve that is lubricated by a system not adversely affected by gravity.

The present invention is directed to a new and improved lubricated type valve that may be employed in high pressure fluid lines such as heaters or other treating units, gathering systems, and recycling and gasoline plants. These valves are typically employed in fluid lines with a working pressure in the range of 3,000–6,000 psig. The valve of the present invention includes a valve housing with first and second ports adaptable to be connected to a high pressure fluid line. A chamber is defined within the valve housing and a cylindrical split core valve member is rotatably mounted within the chamber. A valve stem is rotatably mounted in the valve body and connected to the cylindrical valve core member to allow rotation thereof.

The split cylindrical core valve member includes a cylindrical passage with first and second inlets at opposite ends thereof. The core valve member includes first and second core halves defined along an oblique plane through the cylindrical passage. In this manner, the first valve core half includes a majority of the first inlet and a minority of the second inlet and the second valve core half includes the majority of the second inlet and a minority of the first inlet. In this manner, grooves may be fabricated on the outer peripheral surface of each of the first and second core halves surrounding the majority of the first inlet on the first core half and the majority of the second inlet on the second core half. The grooves are identical on each core valve half and each communicates with a port extending into each core half from a lubricant reservoir. A plunger is mounted within each reservoir and is exposed to line pressure above and to the lubricant below such that line pressure and gravity operate to move the plunger to force lubricant into the grooves to provide the desired lubrication.

BRIEF DESCRIPTION OF THE DRAWINGS

The above and other objects and advantages and novel features of the present invention will become apparent from the following detailed description of a preferred embodiment of the invention illustrated in the accompanying drawings wherein.

DESCRIPTION OF THE PREFERRED EMBODIMENT

Figure 3:
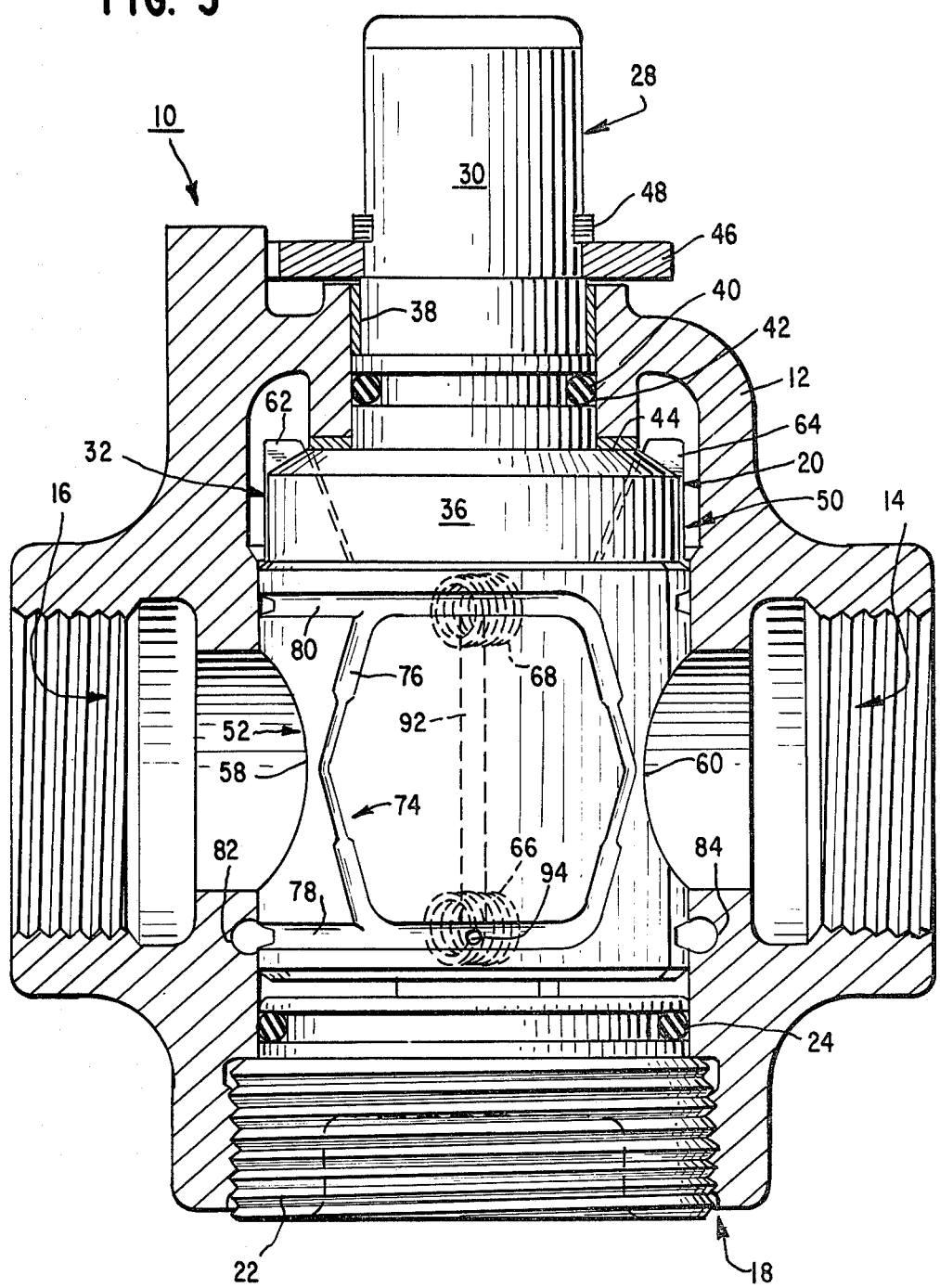
FIG. 3 is a vertical, cross sectional view of the valve constructed in accordance with the principles of the present invention in the open position.
Figure 4:
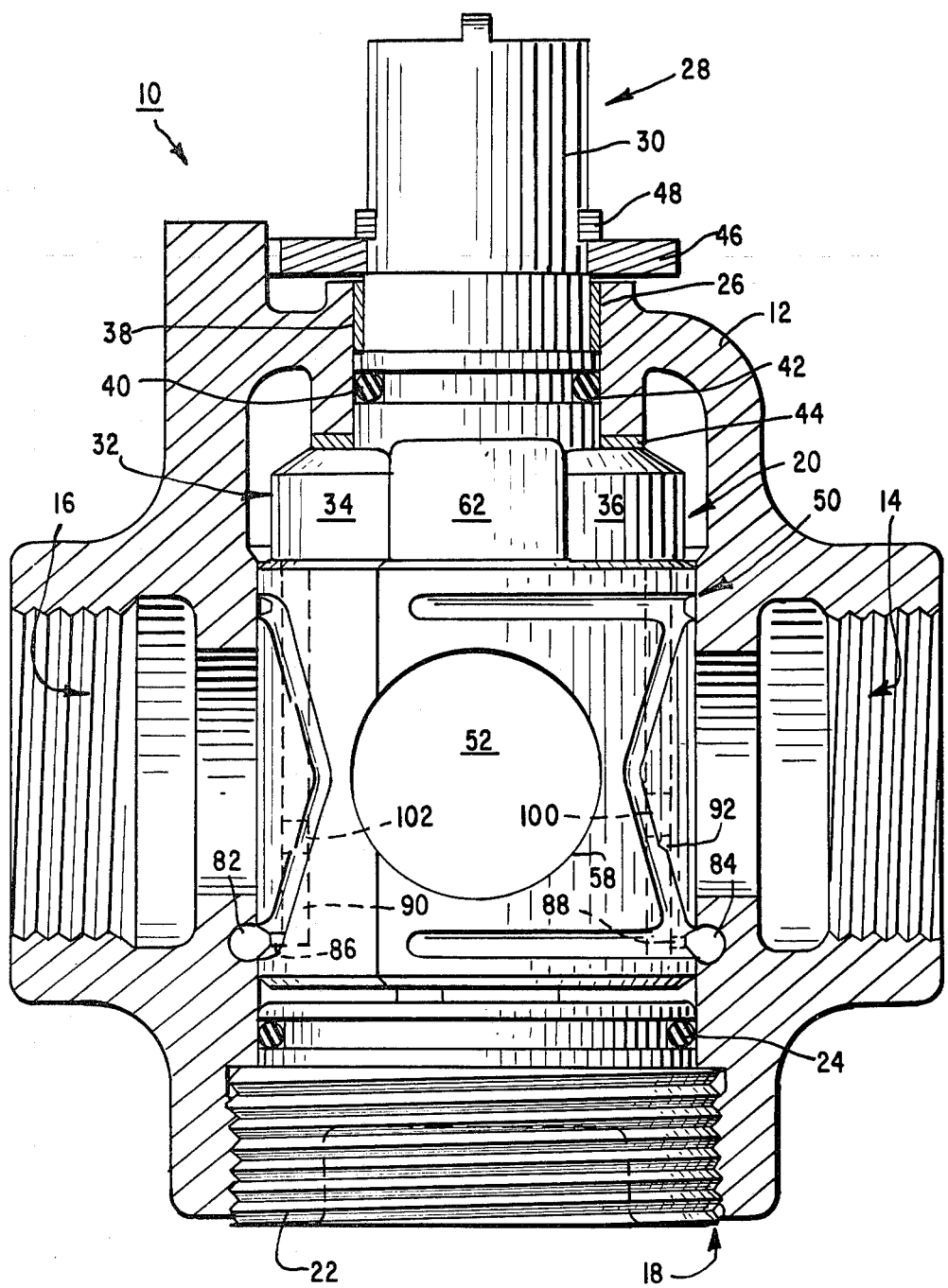
FIG. 4 is a view similar to FIG. 3 of the valve in the closed position.

With reference to FIGS. 3 and 4 there is illustrated a lubricated split plug valve generally designated by the reference numeral 10. The valve 10 may be employed in a high pressure line with working fluid typically in the range of 3,000 to 6,000 psig to control flow therethrough. Due to the high pressures in the pipeline to which the valve 10 is connected, the valve is subjected to substantial downstream pressures resulting in difficult operation. To overcome this problem, the valve 10 includes a lubricating system to allow ease of operation of the valve under high pressure conditions.

The valve 10 includes a valve housing or body 12 with first 14 and second 16 threaded apertures or ports that are adapted to be threadably connected to a fluid pipeline the flow through which the valve 10 is intended to control. The valve 10 also includes an opening 18 to allow access to an interior chamber generally designated by the reference numeral 20 defined within the valve body 12. The opening 18 is closed or covered by a threaded cover 22 that includes a cover seal or O-ring 24 to ensure against leakage.

The body 12 further includes an aperture or opening 26 opposite the opening 18 that communicates with the chamber 20 and allows for the positioning of a stem generally designated by the reference numeral 28. The stem 28 includes an elongated portion or handle 30 that extends out of the opening 26 and may be engageable by a tool or wheel to allow rotation of the stem 28 relative to the body 12. The stem 28 includes opposite the portion 30 a bifurcated end 32 with engagement members 34 and 36 spaced from each other a distance approximately the diameter of the elongated portion 30. To allow rotation of the stem 28 in the opening 26, a stem bearing 38 is positioned around the portion 30 within the opening 26 and an O-ring or stem seal 40 is located in a groove 42 defined in the stem 28 to prevent flow therearound during rotation. To also assist the rotation of the stem 28 a stem thrust bearing 44 is located between the upper surfaces of the engagement members 34, 36 and the housing 12. The stem 28 is held in position with the various components described by a stop collar 46 and a stop collar snap ring 48 located above the opening 26 and the housing of the body 12. The assembly described provides a securely held stem 28 that may be rotated within the body 12 without leakage therearound.

Figure 1:
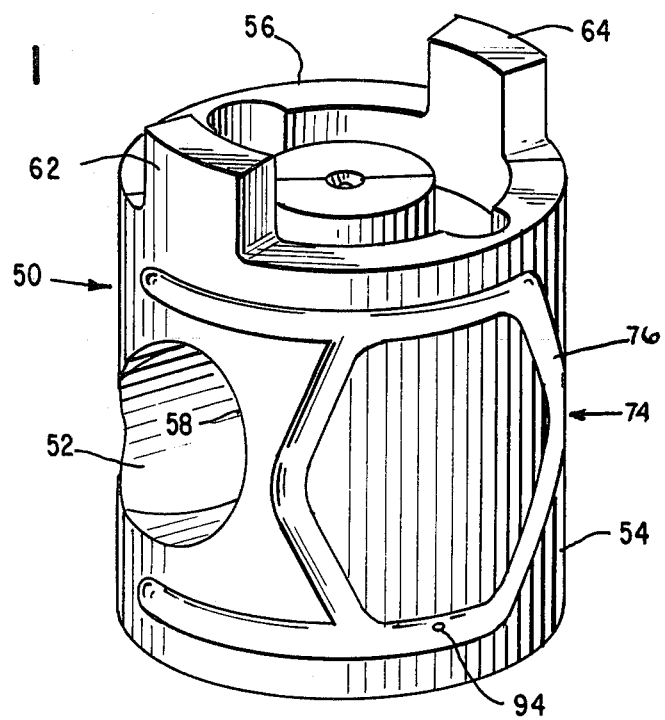
FIG. 1 is a perspective view of the split core valve member constructed in accordance with the principles of the present invention.

The engagement portions 34 and 36 of the stem 28 are intended to engage a cylindrical split plug valve member generally designated by the reference numeral 50. The function of the cylindrical split plug core valve member 50 is to control fluid flow through the valve 10 from one of the ports 14 and 16 through the chamber 20 to the other of the ports 14 and 16. As best illustrated in the FIGS. 1 and 2 the cylindrical split plug valve element 50 includes a cylindrical bore therethrough 52. In the preferred embodiment illustrated, the cylindrical bore 52 extends along a diameter of the split plug valve element 50. In accordance with an important feature of the present invention, the split plug valve element 50 is bisected along a plane passing obliquely through the valve element 50 and the cylindrical bore or passage 52. For example, the oblique plane may be at an angle of 15 degrees to 45 degrees to the diameter of valve element 50 along which the cylindrical passage or bore 52 lies. By cutting or bisecting the split plug valve element 50 in this manner, two valve core halves 54 and 56 are defined.

Figure 2:
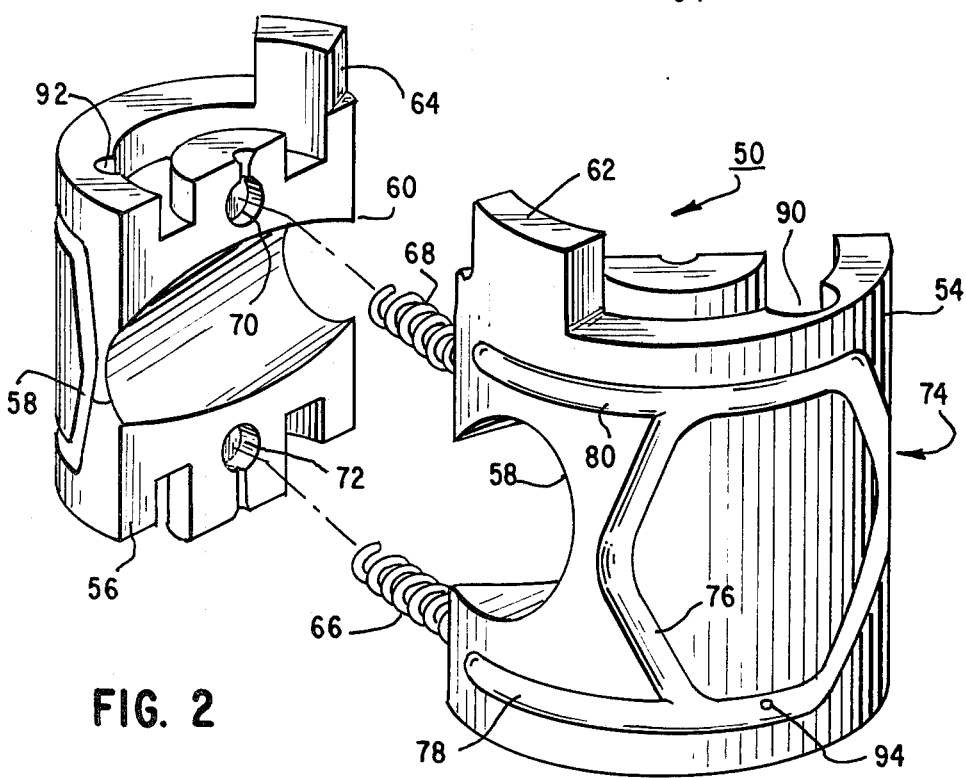
FIG. 2 is a view similar to FIG. 1 illustrating the component valve core halves of the split core valve member illustrated in FIG. 1.

As best illustrated in FIG. 2, the core half 54 includes a major portion of a first inlet 58 to the passage 52 and a minor portion of a second inlet 60 of the cylindrical passage 52. Conversely, the core half 56 includes a minor portion of the inlet 58 and a major portion of the second inlet 60. By this construction as will be described hereinafter, lubrication grooves can be fabricated in the core halves 54 and 56 only that substantially surround the periphery of the inlets 58 and 60 thus allowing the desired amount of lubrication around the entire periphery of the inlets 58 and 60 without the necessity of passages being fabricated in the inner peripheral surface of the valve body 12 as is typical in the prior art.

The core halves 54 and 56 each include an integral lug 62 and 64, respectively. The lugs 62 and 64 are engaged by the engagement members 34 and 36 (FIGS. 3 and 4) and provide a mechanical connection to the stem 28 thereby allowing rotation of the stem 28 to impart rotation to the valve element 50. To ensure a seal of the outer peripheral surface of the valve element 50 with the inner peripheral surface of the housing 20, springs 66 and 68 are mounted in identical apertures 70 and 72 defined in the core halves 54 and 56 and function to bias the core halves 54 and 56 away from each other and into engagement with the inner peripheral surface of the chamber 20 ensuring a seal even when line pressure is low in the system to which the valve 10 is connected.

As previously described, rotation of the valve element 50 can be difficult due to the high pressures of the working fluid passing through the valve 10. Accordingly, a lubricating system is desired in order to allow rotation of the valve element 50 through the employment of the stem 28. The core halves 54 and 56 include identical grooves generally designated by the reference numeral 74 on the outer peripheral surfaces thereof. Each groove 74 includes a substantially continuous or circular portion 76 defined in the area of the core halves 54 and 56 spaced slightly from the inlets 58 and 60 of the cylindrical passage 52. In addition, the grooves 74 include arm portions 78 and 80 extending from the continuous or circular groove 76 outwardly and substantially surrounding the upper and lower edges of the inlets 58 and 60.

As best seen in FIG. 2 and with specific regard to the core half 54, the major portion of the inlet 58 is surrounded by the arm portions 78 and 80 and a portion of the circular portion 76 of the groove 74. As also seen in FIG. 2 with regard to core half 56, the minor portion of the inlet 58 is adjacent the continuous groove 76. Thus, substantially the entire periphery of the inlets 58 and 60 are substantially surrounded by portions of the grooves 74 and a mating groove in the valve body 12 is not required.

Lubricant is provided to the grooves 74 from an external source such as a lubricating gun that may be attached to a fitting (not shown) defined on the housing 12. The fitting is in fluid communication with passages 82 and 84 defined in the valve body 12 (FIGS. 3 and 4). The passages 82 and 84 are in fluid communication through passages 86 and 88, respectively, with lubricant reservoirs 90 and 92, respectively, defined in the core halves 54 and 56. The reservoirs 90 and 92 are in fluid communication at a lower end thereof with the grooves 74 through identical apertures 94 illustrated in FIG. 2 on core 54. A similar aperture is also included in the groove 74 in the core half 56. The reservoirs 90 and 92 are also in fluid communication with the working pressure passing through the cylindrical core 52 by way of communicating passages 96 and 98.

Accordingly, to lubricate the grooves 74, lubricant is introduced into the passages 82 and 84 and if the valve element 50 is in the closed position, the passages 82 and 84 and the passages 86 and 88 are aligned with the apertures 94. Lubricant is then forced into the groove 74 and through the apertures 94 into the reservoirs 90 and 92 below the piston plungers 100 and 102.

In the open position of the valve 10, the passages 82 and 84 are aligned with the grooves 74 at points spaced from the apertures 94. Thus, lubricant is forced directly into the groove 74 and after passing along the grooves 74 to the apertures 94, passes into the reservoirs 90 and 92.

Lubricant is forced out of the reservoirs 90 and 92 under the influence of the plungers 100 and 102 as lubricant in the groove 74 is washed away or flows away. The plungers 100 and 102 are forced downwardly in the reservoirs 90 and 92 under the influence of the stream pressure passing through the apertures 96 and 98 and under the influence of gravity. Due to the location and use of the plungers 100 and 102, if a lubricant tool or gun is not attached to the valve 10 to force lubricant under pressure into the grooves 74, gravity will operate on the plungers 100 and 102 to prevent separation of the plungers 100 and 102 from the lubricant that could result in voids allowing loss of lubricant in the grooves 74 thus reducing the utility of the lubricant and resulting in difficulty in rotating the valve 50. Also, due to the location of the grooves 74 on the core halves 54 and 56, there is no necessity for overlapping or aligning grooves on the core halves 54 and 56 with grooves defined on the inner peripheral surface of the chamber 20 as is required in the prior art. In this manner, there is no substantial pressure drop across aligned grooves thus ensuring the desired pressure level of lubricant within the groove 74 and in locations that substantially surround the entire periphery of the inlets or openings 58 and 60.

In particular, applicant has discovered that the particular representation of the grooves 74, 76, 78, and 80, in cooperation with an obliquely split plug, result in highly superior operation since, as indicated, grooves 78 and 80 and cooperating groove 76 provide virtual encirclement of the port 58, resulting in continuous lubrication in the open position. Further, groove 78 and its corresponding counterpart are in continuous communication with lubricant inlet port 82 or 84 for both open and closed positions. Thus, in contrast with the prior art, lubricant passes directly from its input port to the plug grooves providing vastly superior lubrication and valve sealing. Consequently, the washout effect of the prior art valves is avoided and prior to opening or closing the valves the injection of lubricant under high pressure into the ports 82 and 84 is not required.

What is claimed and desired to be secured by Letters Patent of the United States is:

1. A valve element for a valve comprising:
   a valve body including a cylindrical bore therethrough with first and second ports thereto;
   said valve body split along a plane oblique to said bore to define first and second core members; and
   first and second identical continuous grooves defined in the outer peripheral surfaces of said first and second core members, respectively;
   said first and second grooves each comprising; a first portion circumferentially displaced from said port and a second portion essentially surrounding said port.

2. The valve element set forth in claim 1 further comprising first and second reservoirs defined in said first and second core members, respectively;
   and a plunger slideably mounted in each of said first and second reservoirs.

3. The valve element set forth in claim 2 further comprising first means above said plungers for communicating said first and second reservoirs with line pressure in said valve and second means below said plunger for communication said first and second reservoirs with said first and second grooves, respectively.

4. The valve element set forth in claim 2 wherein said oblique plane lies within an angular range of 15 degrees to 28 degrees to the longitudinal axis of said cylindrical bore.

5. A lubricated plug valve comprising,
   a core valve member including a cylindrical bore with first and second inlets defined therethrough, said core valve member including first and second core halves defined along an oblique plane bisecting said core valve member, said first core half including a majority of said first inlet and a minority of said second inlet and said second core half including a majority of said second inlet and a minority of said first inlet; and each said first and second core halves including a continuous groove defined on the outer surface thereof, said continuous groove circumferentially spaced from said inlets, respectively and having an extending arm portions wherein said continuous grooves and said arm portions substantially surround said first and second inlets of said cylindrical bore.

6. The plug valve claimed in claim 5 further comprising a reservoir defined in each of said first and second core halves and means for communicating said each said reservoir with said continuous groove.

7. The plug valve claimed in claim 6 further comprising a plunger in each said reservoir, first means for communicating pressure above each said plunger, and second means for communicating lubricant below each said plunger.

8. The plug valve claimed in claim 5 wherein said oblique plane is at 45° to the longitudinal axis of said cylindrical bore.

* * * * *